(12) United States Patent
Aimi et al.

(10) Patent No.: US 8,130,214 B2
(45) Date of Patent: Mar. 6, 2012

(54) INPUT APPARATUS

(75) Inventors: Satoru Aimi, Iwaki (JP); Yoshinobu Hosaka, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1244 days.

(21) Appl. No.: 11/836,427

(22) Filed: Aug. 9, 2007

(65) Prior Publication Data

US 2008/0068354 A1    Mar. 20, 2008

(30) Foreign Application Priority Data

Sep. 15, 2006 (JP) ................................. 2006-250541

(51) Int. Cl.
*G09G 5/00*    (2006.01)

(52) U.S. Cl. ........ 345/184; 345/156; 345/159; 345/161; 200/336; 200/341

(58) Field of Classification Search .......... 345/156–167, 345/184; 200/4, 17 R, 329–341
See application file for complete search history.

(56) References Cited

U.S. PATENT DOCUMENTS

| | | | |
|---|---|---|---|
| 5,665,946 A * | 9/1997 | Nishijima et al. | 200/4 |
| 5,894,118 A * | 4/1999 | Nishimoto et al. | 200/527 |
| 6,080,942 A * | 6/2000 | Sasaki | 200/17 R |
| 6,194,673 B1 * | 2/2001 | Sato et al. | 200/4 |
| 6,388,212 B1 * | 5/2002 | Ishihara et al. | 200/18 |
| 6,686,911 B1 * | 2/2004 | Levin et al. | 345/184 |
| 7,094,982 B2 * | 8/2006 | Liu | 200/336 |
| 7,290,213 B2 | 10/2007 | Kake et al. | |
| 7,493,014 B2 | 2/2009 | McGrath et al. | |
| 7,528,330 B2 * | 5/2009 | Behrens | 200/5 R |
| 2002/0003081 A1 * | 1/2002 | Kawase | 200/4 |
| 2003/0128192 A1 | 7/2003 | van Os | |
| 2004/0032395 A1 * | 2/2004 | Goldenberg et al. | 345/156 |
| 2007/0229456 A1 * | 10/2007 | Pihlaja | 345/157 |

FOREIGN PATENT DOCUMENTS

| | | |
|---|---|---|
| JP | 2001-052424 | 8/1999 |
| JP | 2000-194485 | 7/2000 |
| JP | 2002-281457 | 9/2002 |
| JP | 2003-76719 | 3/2003 |
| JP | 2005-532607 | 10/2005 |
| WO | 02-080210 | 10/2002 |

* cited by examiner

*Primary Examiner* — Lun-Yi Lao
*Assistant Examiner* — Gregory J Tryder
(74) *Attorney, Agent, or Firm* — Brinks Hofer Gilson & Lione

(57) ABSTRACT

An input apparatus according to one embodiment of the present invention may include an operation member that is rotatable and is movable in a direction along a rotation axis between an extended position and a pushed-in position. When a user rotates the operation member without pushing in it, a detection output of a predetermined number of pulses can be obtained from a first detection unit each time the operation member is rotated at a predetermined angle. When a user pushes in the operation member and rotates it at a predetermined angle, detection outputs can be continuously obtained from a second detection unit. Consequently, a user can perform a rough retrieval operation on a data set-by-data set basis and a fine data selection operation on a data-by-data basis using a single operation member without repositioning the user's hand.

7 Claims, 7 Drawing Sheets

INPUT APPARATUS

RELATED APPLICATIONS

The present application claims priority to Japanese Patent Application Serial Number 2006-250541, filed Sep. 15, 2006, the entirety of which is hereby incorporated by reference.

BACKGROUND OF THE INVENTION

1. Field of the Invention

The present invention relates to an input apparatus in which two detection units can be operated using a single operation member, and desired data can be selected from among a plurality of pieces of data displayed on a display unit on the basis of an output obtained from each of the detection units.

2. Description of the Related Art

Japanese Unexamined Patent Application Publication No. 2001-52424 discloses a control dial for controlling a reproduction operation performed by an optical disc reproduction apparatus.

The disclosed control dial includes a jog dial and a shuttle dial. The job dial is used to accurately search for a target position from which recorded information will be reproduced and the shuttle dial is used to rapidly reach the vicinity of the target position that is being searched for. The jog dial and the shuttle dial are coaxially arranged, and the shuttle dial is disposed around the periphery of the jog dial.

The target position from which recorded information will be reproduced is accurately set using the control dial in accordance with the following operational procedure.

First (step 1) an outer peripheral surface of the shuttle dial is held with a plurality of fingers and the shuttle dial is rotated so as to search for a position approximate to a target position from which recorded information will be reproduced.

Second (step 2) a forefinger is placed in a depression on the jog dial and the jog dial is rotated so as to reach the vicinity of the target position that is being searched for.

Third (step 3) a hand is placed on a control panel in the vicinity of the jog dial so as to stop the motion, and the forefinger is placed at a peripheral edge portion on the upper surface of the jog dial and the jog dial is moved up and down so as to accurately set the target position.

In the control dial disclosed in the Japanese Unexamined Patent Application Publication No. 2001-52424, in order to search for desired information from large amounts of information recorded on a HDD (Hard Disk Drive), first, the shuttle dial is used to search for a position approximate to the position of the desired information. Subsequently, the jog dial is used to accurately search for the position of the desired information.

In this case, to switch between the dials, a user has to remove their fingers from the shuttle dial to place a finger on the jog dial. Thus, the dial operation becomes complicated and difficult, especially when the control dial is used on an on-vehicle apparatus.

It is desirable to provide an input apparatus allowing a user to perform a rough retrieval operation on a data set-by-data set basis, and a data selection operation on a data-by-data basis, by operating a single operation member that does not require a user to reposition their hand.

SUMMARY OF THE INVENTION

An input apparatus according to one embodiment of the present invention may include: an operation member that is rotatable, and is movable in a direction along a rotation axis between an extended position and a pushed-in position in which the operation member is pushed in from the extended position; a biasing member for biasing the operation member toward the extended position; a first handler that engages the operation member when the operation member is in the extended position and is continuously rotatable along with the operation member; and a second handler that engages the operation member when the operation member is in the pushed-in position, is rotatable along with the operation member in both directions at only a predetermined angle, and is biased toward a neutral position by a neutral biasing member; a first detection unit for obtaining a detection output in accordance with a continuous rotation of the first handler; and a second detection unit for obtaining a detection output when the second handler rotates in either direction.

In an input apparatus according to one embodiment of the present invention, different types of input operations can be performed in accordance with a rotation position at which a single operation member is rotated, that is, the extended position or the pushed-in position. In addition, the first handler is continuously rotatable, and the second handler is rotatable at only a predetermined angle. Accordingly, the hand's movement required for the operation of the first handler is different from that required for the operation of the second handler. Consequently, two different types of operations can be performed with certainty.

In an input apparatus according to one embodiment of the present invention, the first detection unit is a rotary encoder which outputs one pulse for each predetermined angle of rotation of the first handler, and the second detection unit continuously outputs detection signals when the second handler rotates in either direction at a predetermined angle.

In an input apparatus according to one embodiment of the present invention, for example, when a control unit obtains pulses from the first detection unit in a state in which a plurality of pieces of data is being displayed on a display unit, pieces of data of the displayed plurality of pieces of data are sequentially selected on a predetermined unit based on every one pulse or plurality of pulses. In addition, for example, when the control unit continuously obtains detection signals from the second detection unit in a state in which a plurality of pieces of data is being displayed on the display unit, pieces of data of the displayed plurality of pieces of data are sequentially and continuously selected.

In an input apparatus according to one embodiment of the present invention, for example, when the control unit obtains pulses from the first detection unit in a state in which a plurality of pieces of data is being displayed on the display unit, pieces of data of the displayed plurality of pieces of data are sequentially selected on a predetermined unit based on every one pulse or plurality of pulses. In addition, for example, when the control unit continuously obtains detection signals from the second detection unit in a state in which a plurality of pieces of data is being displayed on the display unit, pieces of data of the displayed plurality of pieces of data are sequentially selected on a data set-by-data set basis, the data set having a plurality of pieces of data in excess of the predetermined unit.

In an input apparatus according to one embodiment of the present invention, for example, when the control unit obtains pulses from the first detection unit in a state in which a plurality of pieces of data is being displayed on the display unit, pieces of data of the displayed plurality of pieces of data are sequentially selected on a predetermined unit based on every one pulse or plurality of pulses. In addition, for example, when the control unit continuously obtains detection signals from the second detection unit in a state in which a plurality of pieces of data is being displayed on the display unit, a plurality of pieces of table of content data obtained by classifying the displayed plurality of pieces of data is sequentially selected.

In an input apparatus according to one embodiment of the present invention, a user can perform different types of input operations such as a rough retrieval operation performed on a data set-by-data set basis and a data selection operation performed on a data-by-data basis by operating a single operation member without repositioning the user's hand.

DESCRIPTION OF THE PREFERRED EMBODIMENTS

Figure 1:
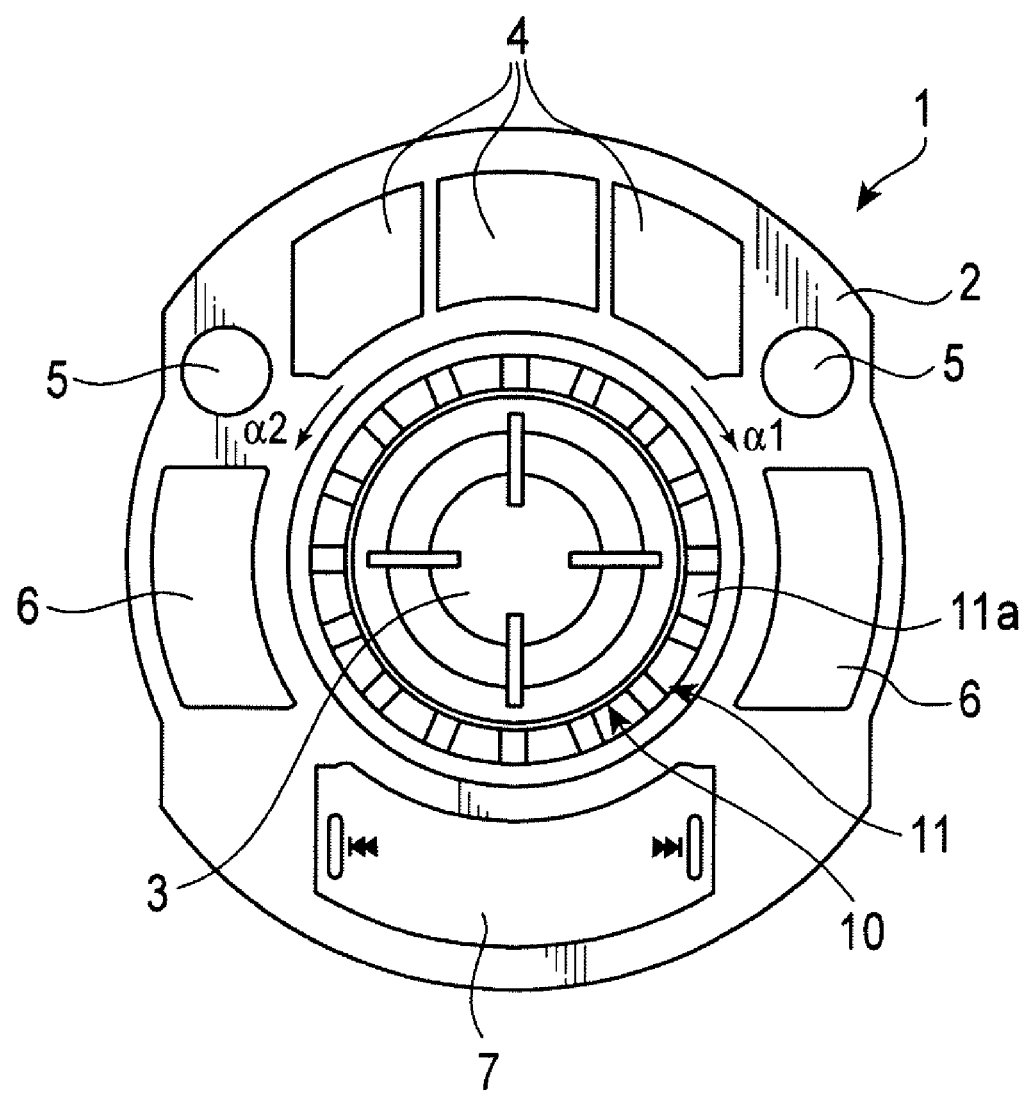
FIG. 1 is an elevational view showing a portion of an operation panel including one embodiment of an input apparatus.

As shown in FIG. 1, an operation panel 1 for an on-vehicle electronic apparatus includes a holder 2. The holder 2 is provided with an operation member 11 forming an input apparatus 10. The operation member 11 is typically cylindrical and is designed to be held with the fingers of one hand. An operation knob 3 is disposed inside the operation member 11. A user rotates, presses, or tilts the operation knob 3 to perform input operations. A user may use push buttons 4, 5, 6, and 7 disposed on the holder 2 to activate another selection switch. In one implementation, the operation member 11 may be substantially disc-shaped, and the operation knob 3 may be diposed inside the operation member 11. However, in other implementations, the operation member 11 may be other shapes and the operation knob 3 may not be disposed inside the operation member 11.

The push buttons 4 are selection switches used to select a mode of operation among modes such as a HDD (Hard Disk Drive) reproduction mode, a CD reproduction mode, a radio mode, etc. The input apparatus 10 is usually used to operate a HDD that records a plurality of songs as music data. A user can retrieve a desired song from among many songs recorded on the HDD by operating the operation member 11 included in the input apparatus 10. The push buttons 5, 6, and 7 may also be used to fast-forward a song that is being reproduced or to find the beginning of a song.

Figure 2:
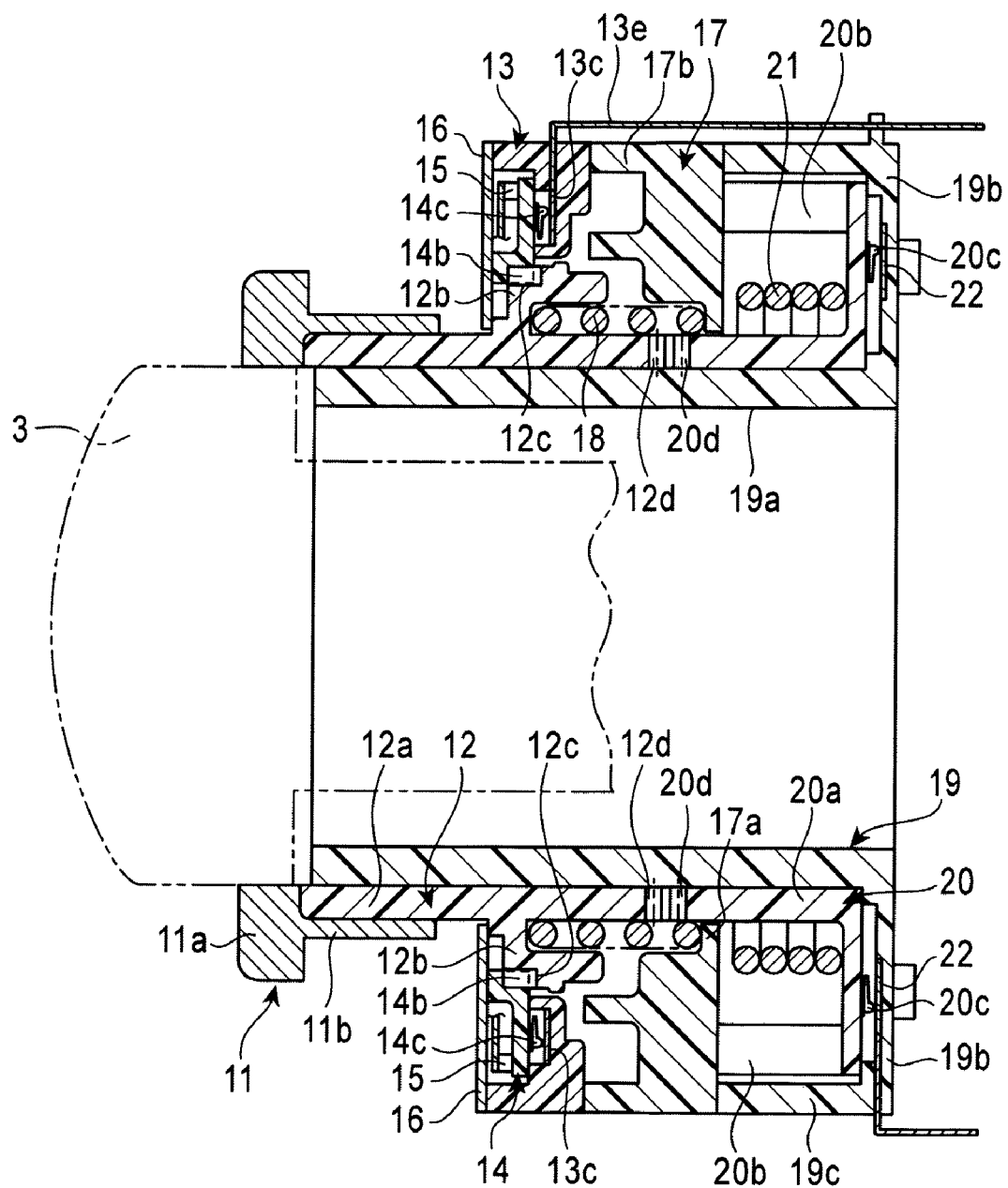
FIG. 2 is a cross-sectional view of one embodiment of an input apparatus.
Figure 3:
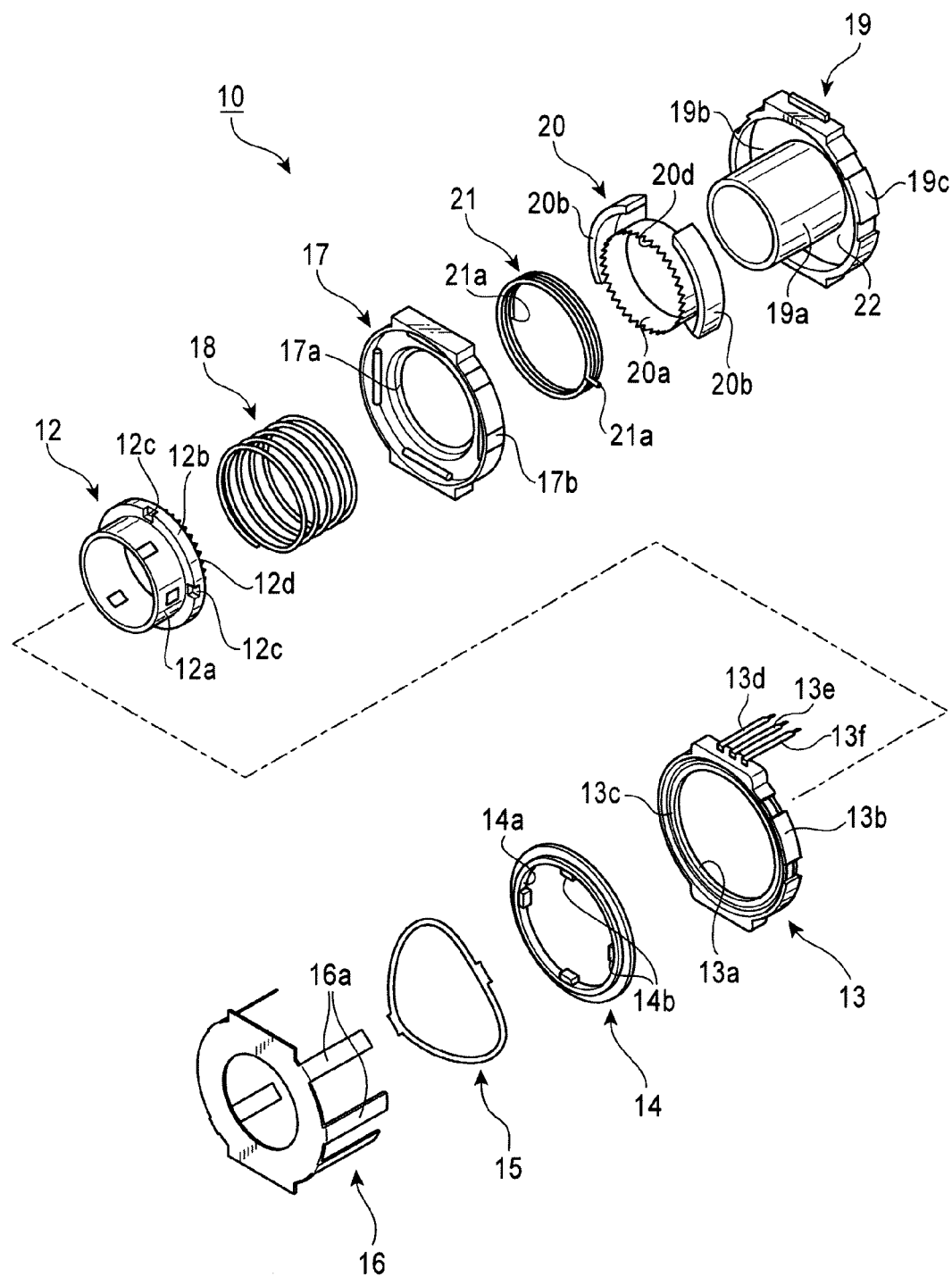
FIG. 3 is an exploded perspective view of one embodiment of an input apparatus.

As shown in FIGS. 2 and 3, a rotating operation portion 11a placed around the periphery of the operation knob 3 and a connecting portion 11b are integrally formed in the cylindrical operation member 11 disposed in the input apparatus 10.

The input apparatus 10 is provided with a base housing 19, which may be made of a synthetic resin material. In the base housing 19, a cylindrical guide portion 19a, a flange portion 19b extending outward from the periphery of the cylindrical guide portion 19a on the side of the base portion thereof, and an outer cylindrical portion 19c extending forward from the periphery of the flange portion 19b are integrally formed. The operation knob 3 shown in FIG. 2 passes through the interior of the cylindrical guide portion 19a and extends rearward beyond the flange portion 19b. This operation knob 3 activates another input device placed behind the flange portion 19b.

An intermediate housing 17 disposed in front of the base housing 19 may be ring-shaped and made of a synthetic resin material. The cylindrical guide portion 19a of the base housing 19 is located in the center hole 17a of the intermediate housing 17. An outer cylindrical portion 17b is formed around the periphery of the intermediate housing 17. The intermediate housing 17 and the base housing 19 are assembled and fixed so that the outer surface of the outer cylindrical portion 17b is flush with the outer surface of the outer cylindrical portion 19c.

A cylindrical moving fitting member 12 disposed in front of the intermediate housing 17 may be made of a synthetic resin material. In the moving fitting member 12, a cylindrical portion 12a, and a flange portion 12b extending outward from the periphery of the cylindrical portion 12a, are integrally formed. As shown in FIG. 2, the cylindrical guide portion 19a of the base housing 19 is inserted into the hole of the cylindrical portion 12a without leaving a clearance between the inner surface of the cylindrical portion 12a and the outer surface of the cylindrical guide portion 19a. The moving fitting member 12 can continuously rotate while sliding on the outer surface of the cylindrical guide portion 19a. Additionally, the moving fitting member 12 can perform a reciprocating motion in the axial direction of the cylindrical guide portion 19a.

As shown in FIG. 2, the connecting portion 11b of the operation member 11 is fixedly fitted on the outer surface of the cylindrical portion 12a of the moving fitting member 12. The operation member 11 and the moving fitting member 12 can operate together in a rotational direction, and forward and backward directions, as a single operation member according to an embodiment of the present invention.

As shown in FIGS. 2 and 3, a plurality of fitting grooves 12c composing a front fitting portion (first fitting portion) is formed at regular intervals in the circumferential direction on the front face of the flange portion 12b of the moving fitting member 12. In addition, a plurality of fitting protrusions 12d composing a rear fitting portion (second fitting portion) is formed at regular intervals in the circumferential direction on the rear end face of the moving fitting member 12.

As shown in FIG. 2, a front housing 13 disposed around the periphery of the moving fitting member 12 is ring-shaped. The cylindrical guide portion 19a of the base housing 19 and the flange portion 12b of the moving fitting member 12 are located in the center hole 13a of the front housing 13. An outer cylindrical portion 13b is formed around the periphery of the front housing 13. The front housing 13 and the intermediate housing 17 are assembled and fixed so that the outer surface of the outer cylindrical portion 13b is flush with the outer surface of the outer cylindrical portion 17b of the intermediate housing 17.

As shown in FIG. 3, three lead terminals 13d, 13e, and 13f are attached to the front housing 13. In some implementations the three lead terminals 13d, 13e, and 13f are formed of a metal plate and the front housing 13 comprise synthetic resin material by insert molding. However, other material may also be used for the three lead terminals 13d, 13e, and 13f, and the front housing 13. As shown in FIG. 2, a substrate 13c for a rotary encoder is fixed on the front face of the front housing 13. Three conductive patterns are formed on the front face of the substrate 13c, and are individually connected to the lead terminals 13d, 13e, and 13f. The three conductive patterns are a common pattern, a forward rotation pattern, and a reverse rotation pattern.

A first handler 14 is disposed in front of the front housing 13. The first handler 14 may be ring-shaped and made of a synthetic resin material. Fitting protrusions 14b protrude from the inner peripheral edge of the center hole 14a of the first handler 14 toward the center. The fitting protrusions 14b are formed at the same intervals as the fitting grooves 12c formed in the moving fitting member 12. Therefore, the fitting protrusions 14b and the fitting grooves 12c can engage each other.

As shown in FIG. 2, slide connection points 14c are disposed on the rear face of the first handler 14. The slide connection points 14c slide on the three conductive patterns formed on the substrate 13c. The common pattern and the forward rotation pattern, or the common pattern and the reverse rotation pattern, are intermittently contacted at evenly spaced time intervals in accordance with the rotation angle of the slide connection points 14c. Accordingly, if the first handler 14 is rotated in a forward direction, one pulse is outputted every predetermined rotation angle from any two of the lead terminals 13d, 13e, and 13f. Consequently, pulse trains each having a pulse repetition period which is inversely proportional to the rotation speed of the first handler 14 are obtained. If the first handler 14 is rotated in a reverse direction, pulse trains corresponding to the rotation angle are similarly outputted from any two of the lead terminals 13d, 13e, and 13f.

A circular leaf spring 15 is disposed in front of the first handler 14. In front of the leaf spring 15, a ring-shaped cover 16 is disposed. The cover 16 is tightly attached to the front housing 13. Furthermore, fixing pieces 16a of the cover 16 are bent along the rear face of the base housing 19. Thus, the cover 16 is fixed in front of the front housing 13. Consequently, the first handler 14 and the leaf spring 15 are sandwiched between the front housing 13 and the cover 16. The elastic force of the leaf spring 15 presses the slide connection points 14c, which are disposed on the rear face of the first handler 14, against the substrate 13c disposed on the front housing 13.

A biasing member 18, which is a compression coil spring, is disposed between the intermediate housing 17 and the moving fitting member 12, and biases the moving fitting member 12 forward. When there is no external force working on the operation member 11, the biasing member 18 pushes the moving fitting member 12 forward so that the fitting grooves 12c of the moving fitting member 12 and the fitting protrusions 14b of the first handler 14 engage each other. At that time, if the moving fitting member 12 is rotated along with the operation member 11, the first handler 14 is rotated along with the operation member 11 and the moving fitting member 12.

In the input apparatus 10, the substrate 13c for a rotary encoder, the conductive patterns formed on the substrate 13c, and the slide connection points 14c compose a first input unit 101.

A second handler 20 is disposed at a position that is located between the base housing 19 and the intermediate housing 17, and behind the first handler 14 in the rotation axis direction of the operation member 11. The second handler 20 may be made of a synthesis resin material, and has a cylindrical portion 20a in its inner periphery. As shown in FIG. 2, the cylindrical portion 20a is slidably disposed on the outer surface of the cylindrical guide portion 19a formed in the base housing 19 without leaving a clearance therebetween. The second handler 20 can rotate in each of directions α1 and α2 but can not rotate within a certain angular range (for example, 60°) because of a stopper (not shown).

A neutral biasing member 21 which is a torsion spring is disposed between the second handler 20 and the intermediate housing 17. One of an arm portions 21a of the neutral biasing member 21 is retained at the second handler 20 and the other of arm portions 21a is engaged to the intermediate housing 17. Accordingly, the second handler 20 is always in a neutral position between the directions α1 and α2 shown in FIG. 1. If the second handler 20 is rotated in the direction α1 or α2 and then the rotational force applied to the second handler 20 ceases, the second handler 20 returns to the neutral position.

A shuttle substrate 22 is disposed on the front face of the flange portion 19b of the base housing 19. A pair of electrodes is formed at an end of the shuttle substrate 22 in the direction α1, and another pair of electrodes is formed at an end of the shuttle substrate 22 in the direction α2. Slide connection points 20c are disposed on the rear face of the second handler 20. While the second handler 20 is rotated in the direction α1, a pair of electrodes is brought into a conductive state by one of the slide connection points 20c. Consequently, detection outputs can be continuously obtained. Furthermore, while the second handler 20 is rotated in the direction α2, another pair of electrodes is similarly brought into a conductive state by the other one of the slide connection points 20c and detection outputs can be continuously obtained.

Fitting grooves 20d are formed at regular intervals in the circumferential direction on the front face of the second handler 20. When the moving fitting member 12 is pushed along with the operation member 11, the engagement between the fitting grooves 12c of the moving fitting member 12 and the fitting protrusions 14b of the first handler 14 is lost, and the fitting protrusions 12d of the moving fitting member 12 and the fitting grooves 20d of the second handler 20 engage each other. Accordingly, when a user rotates the operation member 11 while pushing it, the first handler 14 is not rotated but the second handler 20 is rotated along with the operation member 11 and the moving fitting member 12.

In the input apparatus 10, the electrodes formed on the shuttle substrate 22 and the slide connection points 20c disposed in the second handler 20 compose a second input unit 102.

When a user holds and rotates the ring-shaped operation member 11 with their fingers without pushing the operation member 11, an output of one pulse can be intermittently obtained from the first input unit 101 at every predetermined angle. Furthermore, a pulse train can be obtained from different lead terminals in accordance with a rotation direction of the operation member 11, that is, a forward or reverse rotation direction. Subsequently, when the user rotates the operation member 11 in the direction α1 or α2, against the biasing force of the neutral biasing member 21, while pushing the operation member 11 against the biasing force of the biasing member 18, a detection output can be obtained from the second input unit 102. When the rotational force that is being applied to the operation member 11 ceases, the second holder 20 returns to the neutral position due to the biasing force of the neutral biasing member 21, and the detection output obtained from the second input unit 102 is interrupted.

Figure 4:
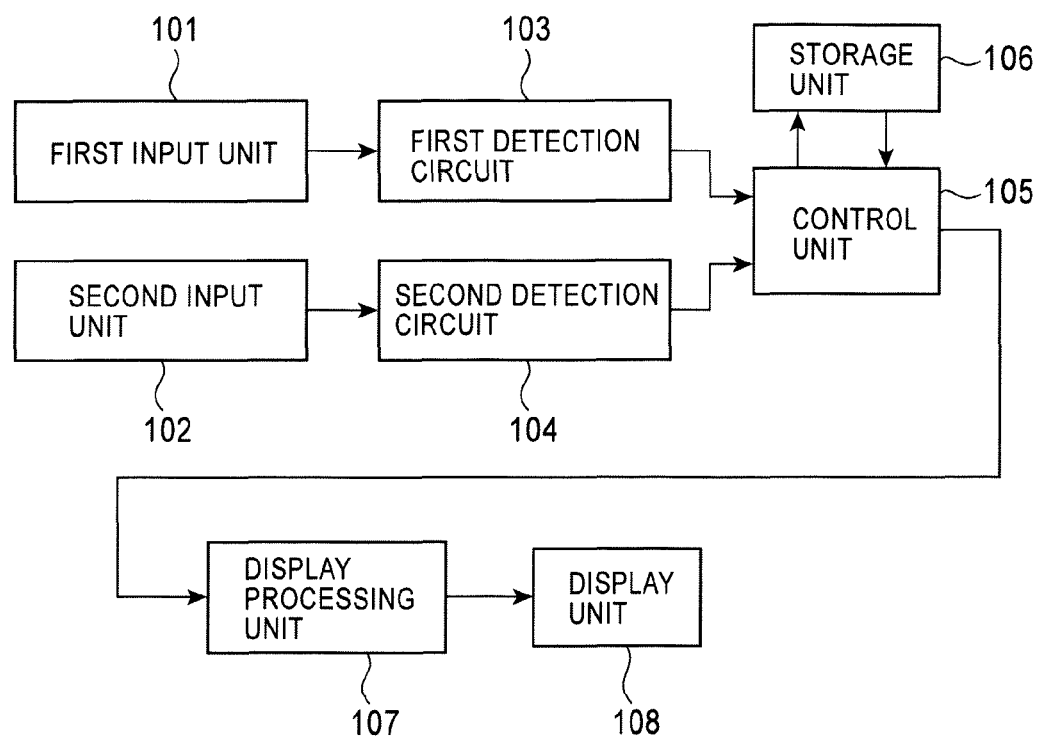
FIG. 4 is a circuit block diagram of one embodiment of an input apparatus.

As shown in FIG. 4, in the input apparatus 10, a detection signal obtained from the first input unit 101 is supplied to a first detection circuit 103. In the first detection circuit 103, outputs obtained from the lead terminals 13d, 13e, and 13f by rotating the operation member 11 in the forward or reverse direction are formed into rectangular pulses, and the rectangular pulses are supplied to a control unit 105. A detection output obtained from the second input unit 102 is supplied to a second detection circuit 104. In the second detection circuit 104, when the operation member 11 is rotated in the direction α1 or α2 at a predetermined angle, a detection output is obtained and is then supplied to the control unit 105. Here, in the second detection circuit 104, it is possible to supply different detection outputs to the control unit 105 in accordance with the rotation angle of the operation member 11.

A storage unit 106 stores data. In this embodiment, the storage unit 106 may be a rewritable memory that stores various pieces of data such as the numbers, titles, addresses and lengths of songs recorded on a HDD (not shown). The control unit 105 performs data retrieval from the storage unit 106 in accordance with the operations performed by the first input unit 101 and the second input unit 102. The result of this data retrieval is supplied from the control unit 105 to a display processing unit 107, and is displayed on a display unit 108 such as a liquid crystal panel. When any one of the press buttons shown in FIG. 1 is operated after a certain song has been retrieved by the operations of the first input unit 101 and the second input unit 102, reproduction of the selected song begins. More specifically, music data of the selected song is read out from the HDD, and reproduced by a reproduction unit (not shown) that may include an amplifier and a speaker.

Next, a data reproduction operation will be described in which data of a desired song is selected from a plurality of data lists stored in the storage unit 106 and reproduced. In the following embodiments, a retrieval procedure is performed based on an artist name displayed on the display unit 108. However, the retrieval procedure may be performed based on another piece of data such as a song title, a genre name, an album name, or a playlist name.

First, a list of artist names (artist list) is displayed on a display screen (the display unit 108) by operating any one of the push buttons 4, 5, 6, and 7, the operation knob 3, or the operation member 11 shown in FIG. 1.

Figure 5:
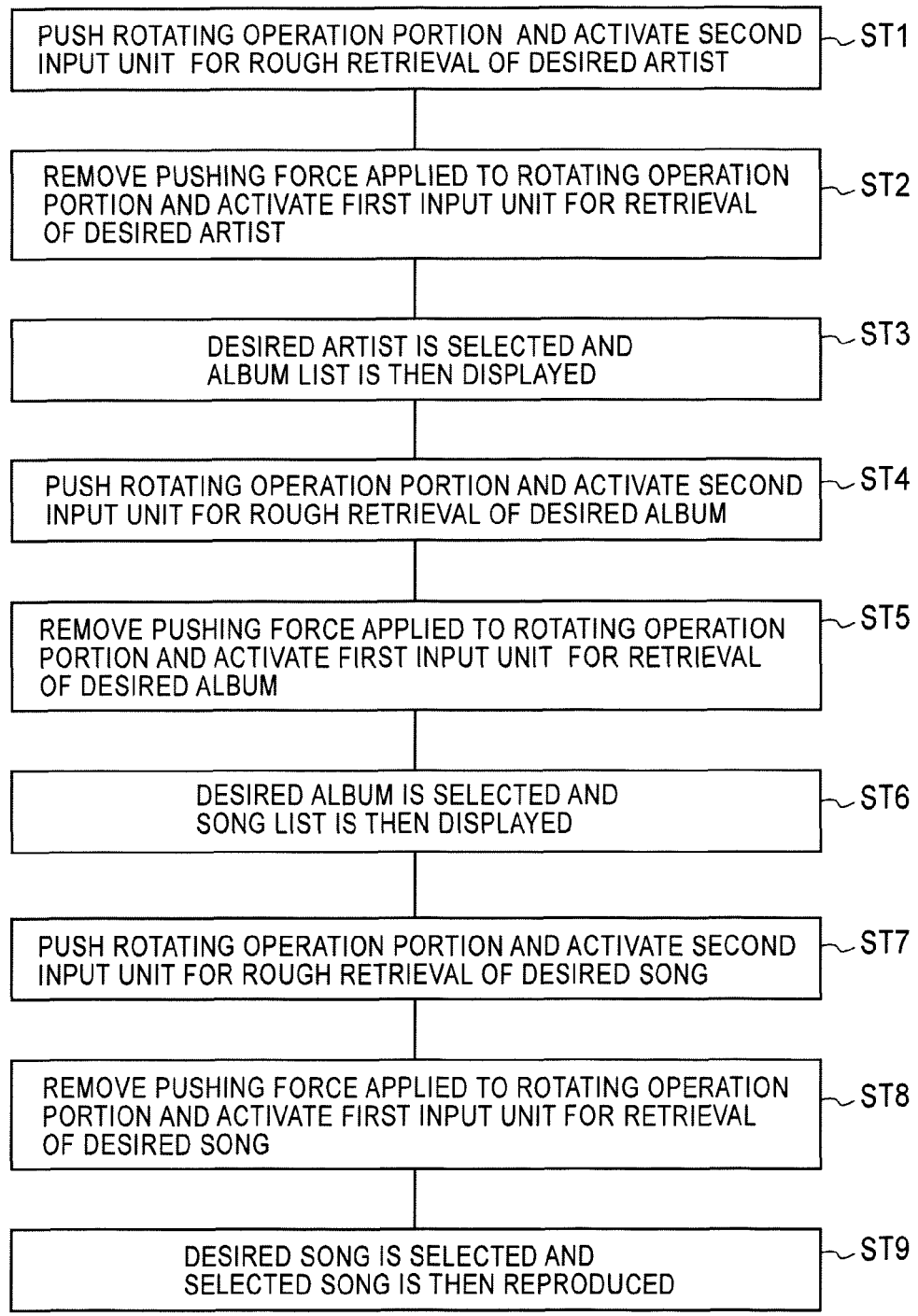
FIG. 5 is a flowchart showing one embodiment of a method of retrieving a desired song and reproducing the retrieved song.

Next, in a step ST1 shown in FIG. 5, the operator holds the rotating operation portion 11a of the operation member 11 with the fingers of one hand and pushes in the rotating operation portion 11a so that the moving fitting member 12 and the second handler 20 engage each other, and rotates the rotating operation portion 11a in the direction α1 or α2 at only a predetermined angle. At that time, the second input unit 102 is activated, and a data list is roughly searched (rough retrieval) by displaying the data list on the display unit 108.

The operator can set the rough retrieval method, which is performed with the second input unit 102, using any one of the operation portions shown in FIG. 1 in advance for the operator's convenience.

Figure 6:
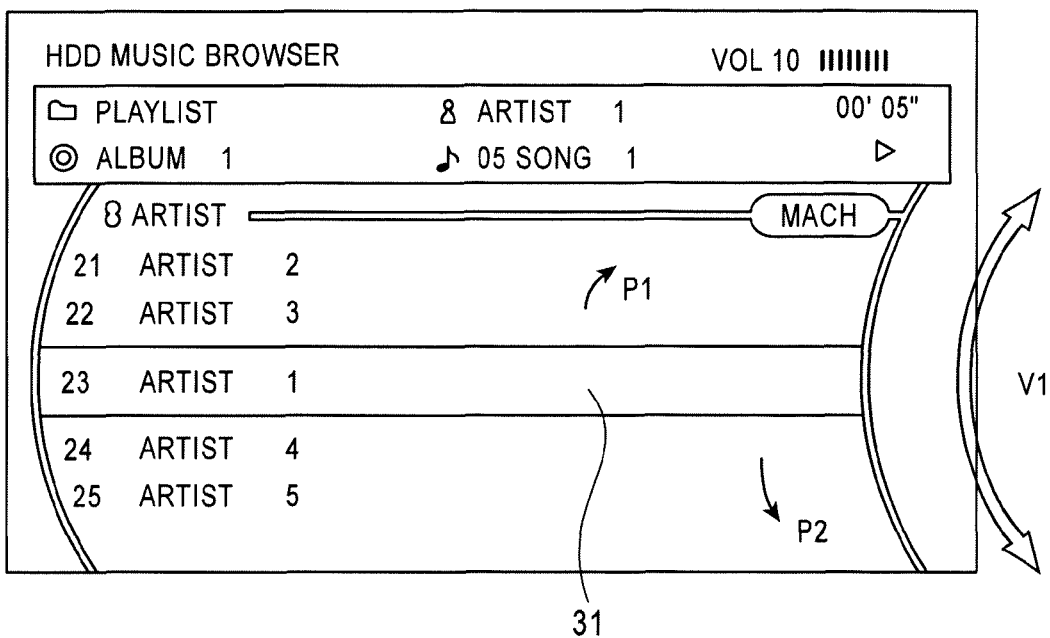
FIG. 6 is a diagram illustrating one embodiment of a rough retrieval method.

In the case of a method shown in FIG. 6, when an operator pushes the rotating operation portion 11a of the operation member 11 and rotates it in the direction α1 at only a predetermined angle with the operator's fingers, the second handler 20 is rotated in the direction α1 at the predetermined angle, and one of the slide connection points 20c disposed at the second handler 20 contacts a pair of electrodes formed on the shuttle substrate 22 into a conductive state. While the rotating operation portion 11a is rotated in the direction α1, operation signals are continuously supplied from the second input unit 102 to the control unit 105.

The operation signals are processed in the control unit 105, whereby artist names are scrolled through in a direction P1 at a speed V1, which is higher than a speed of fine retrieval using the first input unit 101, on a display screen. When any one of the scrolled artist names reaches the position of a selection bar 31, the artist name in the selection bar 31 is highlighted as distinguished from other artist names. Furthermore, when the rotating operation portion 11a is rotated in the direction α2 at a predetermined angle, the artist names are scrolled through in a direction P2 at the speed V1 on the display screen. Subsequently, when any one of the scrolled artist names reaches the position of the selection bar 31, the artist name in the selection bar 31 is highlighted as distinguished from other artist names. During this high-speed scrolling, in order to allow the operator to know that the rough retrieval is being performed, for example, a character string "MACH" shown in FIG. 6 or a symbol is displayed. Thus, the rough retrieval of a desired artist can be performed using a data set including the desired artist.

Here, in order to change the speed V1 for scrolling in accordance with the rotation angle of the second handler 20 that is rotated in the direction α1 or α2 along with the operation member 11, a plurality of electrodes may be formed on the shuttle substrate 22.

Figure 7:
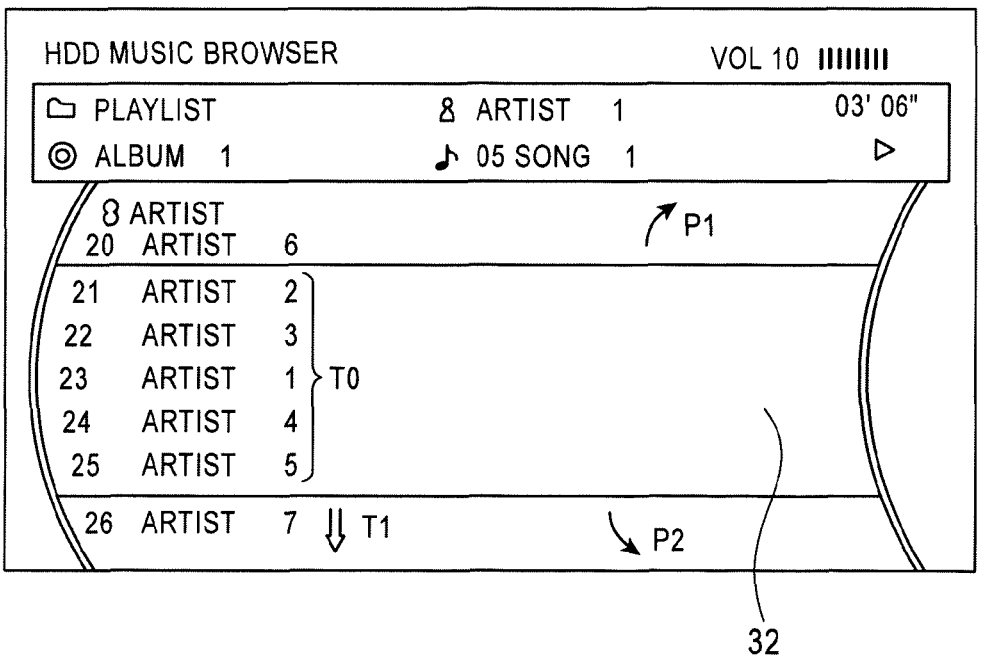
FIG. 7 is a diagram illustrating another embodiment of a rough retrieval method.

Next, in the case of a method shown in FIG. 7, when an operator pushes in the rotating operation portion 11a of the operation member 11 and rotates it in the direction α1 at a predetermined angle with the operator's fingers, the selection bar 31 displayed on the display unit 108 is changed into a thick selection bar 32, which is thicker than the selection bar 31 by expanding up and down the selection bar 31. A plurality of artist names in the thick selection bar 32 is displayed as distinguished from other artist names. In FIG. 7, five artist names are displayed in the thick selection bar 32 as distinguished from other artist names. Here, the number of artists displayed as distinguished from other artists may be two to four, or may be six or more if they can be displayed on the display screen.

When the rotating operation portion 11a is rotated in the direction α1, a data set T0 including the five artist names displayed in the thick selection bar 32 moves toward the direction P1. Subsequently, the other data set T1 including five artist names arranged on the side of the direction P2 is displayed in the thick selection bar 32 in the middle of the display screen. While the rotating operation portion 11a is being rotated in the direction α1, data sets of five artist names sequentially move toward the direction P1, and the data set displayed on the display screen is changed. When the rotating operation portion 11a is returned to its neutral position, the movement of the data sets of five artist names is stopped, and the data set placed in the thick selection bar 32 at that time is displayed on the display screen.

Furthermore, when the rotating operation portion 11a is pushed in and is rotated in the direction α2 at a predetermined angle, rough retrieval is performed in such a manner that a data set of five artist names displayed in the thick selection bar 32 moves toward the direction P2, and the next data set of five artist names is placed in the thick selection bar 32. Thus, in the case of the rough retrieval method shown in FIG. 7, data sets each including, for example, five pieces of data are sequentially displayed on the display screen. When the rotational force applied to the rotating operation portion 11a is removed, the data set placed in the thick selection bar 32 at that time is continuously displayed. Here, a switching period between the data sets may vary in accordance with the rotation angle of the rotating operation portion 11a. In addition, the thickness of the thick selection bar 32, which is the number of pieces of data displayed as distinguished from other pieces of data, may be changed in accordance with the rotation angle of the rotating operation portion 11a.

Figure 8:
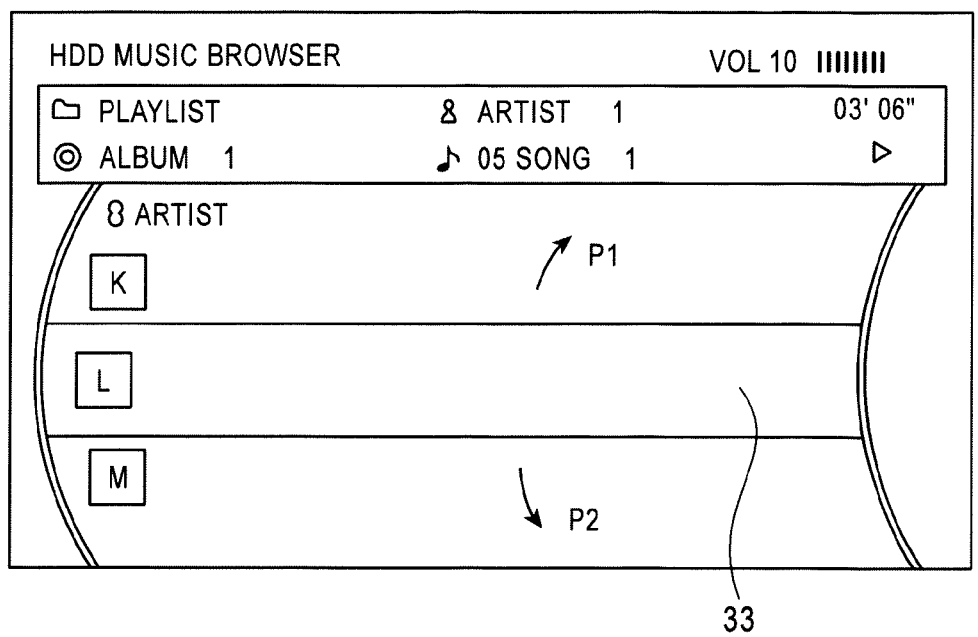
FIG. 8 is a diagram illustrating another embodiment of a rough retrieval method.

Next, in the case of a method shown in FIG. 8, when the rotating operation portion 11a of the operation member 11 is pushed in and is rotated in the direction α1 at a predetermined angle, alphabet letters are immediately displayed in alphabetical order on a display screen. The alphabet letters that denote leading characters of artist names are sequentially displayed in a selection bar 33 on a one-by-one basis and are scrolled through in the direction P1 on a one-by-one basis. Furthermore, when the rotating operation portion 11a is pushed in and is rotated in the direction α2 at a predetermined angle, the alphabet letters are scrolled through in the direction P2. Here, the speed of scrolling of the leading characters may be changed in accordance with the rotation angle of the rotating operation portion 11a.

In this method, a plurality of artist names stored in the storage unit 106 is classified into data sets of artist names each having the same leading character. Alphabet letters denoting leading characters of artist names are displayed as the table of contents for a plurality of data sets. The rough retrieval can be performed using the leading characters. Here, in the case of the rough retrieval method shown in FIGS. 7 and 8, a character string or a symbol allowing an operator to know that the rough retrieval being performed can be displayed on the display screen.

When the pushing force applied to the rotating operation portion 11a of the operation member 11 ceases and the second handler 20 returns to its neutral position, a plurality of artist names having the leading character of the alphabet letter which is placed in the selection bar 33 at that time is displayed.

Figure 9:
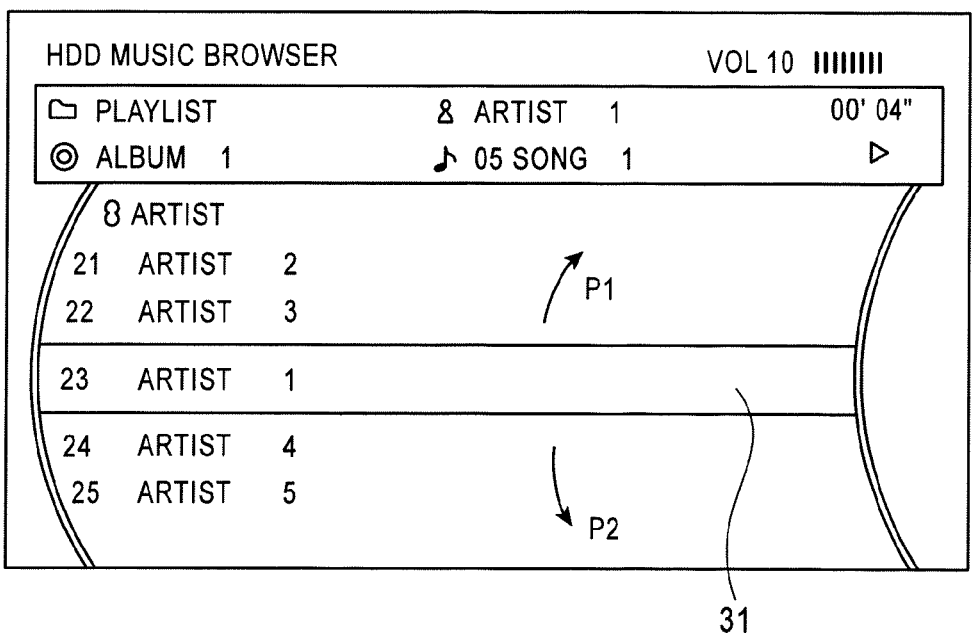
FIG. 9 is a diagram illustrating an embodiment of a retrieval method performed using a first input unit.

Referring to FIG. 9, when an operator holds the rotating operation portion 11a of the operation member 11 with the operator's fingers, and rotates it in the direction α1 without pushing in it, the first input unit 101 is activated and outputs one pulse each time the operation member 11 is rotated at a predetermined angle. Each time a one-pulse output is obtained from the first input unit 101, only a single artist name in the selection bar 31 moves toward the direction P1 on a display screen as shown in FIG. 9. Thus, the artist name in the selection bar 31 is changed. The scroll speed of artist names is proportional to the rotation speed of the rotating operation portion 11a and the first handler 14. In addition, when the operator rotates the rotating operation portion 11a in the direction α2 without pushing in it, artist names are shifted in the direction P2 on a one-by-one basis. Here, the artist names may be shifted on a one-by-one basis each time a plurality of pulses, for example, two pulses are output from the first input unit 101.

When any one of the artist names is selected and is displayed in the selection bar 31 based on the above-described retrieval operation in a step ST2, if the selection of the artist name in the selection bar 31 is established by pushing any one of the push buttons 4, 5, 6, or 7, or the operation knob 3 in a step ST3, the display screen is changed. On a new display screen, a list of album names of the selected artist is displayed.

Subsequently, the process proceeds to a step ST4 in a state in which the album list is displayed on the display screen. In the step ST4, like the step ST1, the rotating operation portion 11a is pushed in and is rotated to perform the rough retrieval of a desired album name using any one of the methods shown in FIGS. 6 to 8.

After the rough retrieval has been completed in the step ST4, the process proceeds to a step ST5. In the step ST5, like the step ST2, the desired album name is accurately retrieved by rotating the rotating operation portion 11a without pushing in it.

After the desired album name has been accurately retrieved, the process proceeds to a step ST6. In the step ST6, like the step ST3, the selection of the album placed in the selection bar 31 is established. Subsequently, the display screen is changed. On a new display screen, a list of a plurality of song names included in the selected album is displayed.

Subsequently, the process proceeds to a step ST7 in a state in which the list of song names is displayed on the display screen. In the step ST7, like the step ST1 and the step ST4, the rough retrieval of a desired song name is performed using any one of the methods shown in FIGS. 6 to 8. After the rough retrieval has been completed in the step ST7, the process proceeds to a step ST8. In the step ST8, like the step ST2 and the step ST5, the desired song name is accurately retrieved in the first input unit 101.

After the desired song name has been accurately retrieved, the process proceeds to a step ST9. In the step ST9, like the step ST3 and the step ST6, the selection of the song name placed in the selection bar 31 is established. Subsequently, the selected song is reproduced.

As described previously, in the present invention, an operator can push in and rotate a single operation member, that is, the operation member 11, with the operator's fingers. Accordingly, it is possible to easily perform the rough retrieval using the second input unit 102, which is a shuttle encoder, and the fine retrieval using the first input unit 101, which is a rotary encoder, without repositioning the operator's hand. Accordingly, a driver can easily perform the input operation of the input apparatus 10 while driving.

In the above-described embodiments, examples in which an input apparatus according to an embodiment of the present invention is used for song retrieval in an on-vehicle electronic apparatus have been described. However, the application of the input apparatus is not limited to the above-described examples. For example, the input apparatus can be used for retrieval of a road name, a city name, or a place name in a navigation apparatus. In addition, an input apparatus according to an embodiment of the present invention can be applied to a computer input device, etc. It is therefore intended that the foregoing detailed description be regarded as illustrative rather than limiting, and that it be understood that it is the following claims, including all equivalents, that are intended to define the spirit and scope of this invention.

What is claimed is:

1. An input apparatus comprising:
    an operation member that is rotatable and is movable in a direction along a rotation axis between an extended position and a pushed-in position, wherein the operation member is pushed in from the extended position to the pushed-in position;
    a biasing member for biasing the operation member toward the extended position;
    a first handler that engages the operation member when the operation member is in the extended position and is continuously rotatable along with the operation member;
    a second handler that engages the operation member when the operation member is in the pushed-in position, wherein the second handler is rotatable along with the operation member in either direction of rotation at a predetermined angle and wherein a neutral biasing member biases the second handler toward a neutral position;
    a first detection unit for obtaining a detection output based on a rotation of the first handler, wherein the first detecting unit comprises a rotary encoder that outputs one pulse for each predetermined angle of rotation of the first handler; and a second detection unit for obtaining a detection output based on a rotation of the second handler, wherein the second detection unit continuously outputs detection signals when the second handler rotates in either direction at a predetermined angle; and a control unit for obtaining a detection output from each of the first detection unit and the second detection unit and outputting display data to a display unit;

wherein, when the control unit obtains pulses from the first detection unit in a state in which a plurality of pieces of data is being displayed on the display unit, pieces of data of the displayed plurality of pieces of data are sequentially selected on a predetermined unit based on the obtained pulses; and wherein, when the control unit continuously obtains detection signals from the second detection unit in a state in which a plurality of pieces of data is being displayed on the display unit, pieces of data of the displayed plurality of pieces of data are sequentially selected on a data set-by-data set basis, the data set comprising a plurality of pieces of data in excess of the predetermined unit.

2. The input apparatus of claim 1,
wherein, when detection signals are continuously outputted from the second detection unit, a rough retrieval operation is performed in which pieces of data of the displayed plurality of pieces of data are sequentially selected on a data set-by-data set basis; and
wherein the control unit changes a switching period between the data sets in accordance with a rotation angle of the second handler.

3. The input apparatus of claim 1,
wherein, when detection signals are continuously outputted from the second detection unit, a rough retrieval operation is performed in which pieces of data of the displayed plurality of pieces of data are sequentially selected on a data set-by-data set basis; and
wherein the control unit displays on the display unit a character string or a symbol allowing a user to know that the rough retrieval operation is being performed.

4. An input apparatus comprising:
an operation member that is rotatable and is movable in a direction along a rotation axis between an extended position and a pushed-in position, wherein the operation member is pushed in from the extended position to the pushed-in position;
a biasing member for biasing the operation member toward the extended position;
a first handler that engages the operation member when the operation member is in the extended position and is rotatable with the operation member;
a second handler that engages the operation member when the operation member is in the pushed-in position, wherein the second handler is rotatable along with the operation member in either direction of rotation at a predetermined angle, and wherein a neutral biasing member biases the second handler toward a neutral position;
a first detection unit for obtaining a detection output in accordance with a continuous rotation of the first handler, the first detection unit being a rotary encoder that outputs one pulse signal to a control unit for each predetermined angle of rotation of the first handler;
a second detection unit for obtaining a detection output when the second handler rotates in either direction of rotation and continuously outputting detection signals when the second handler rotates in either direction of rotation at a predetermined angle; and
a control unit for obtaining a detection output from each of the first detection unit and the second detection unit and outputting display data to a display unit;
wherein, when the control unit obtains pulses from the first detection unit in a state in which a plurality of pieces of data is being displayed on the display unit, pieces of data of the displayed plurality of pieces of data are sequentially selected on a predetermined unit based on the obtained pulses; and
wherein, when the control unit continuously obtains detection signals from the second detection unit in a state in which a plurality of pieces of data is being displayed on the display unit, pieces of data of the displayed plurality of pieces of data are sequentially selected on a data set-by-data set basis, the data set comprising a plurality of pieces of data in excess of the predetermined unit.

5. The input apparatus of claim 4,
wherein the first handler and the second handler are substantially aligned along an axis of rotation; and
wherein the operation member is provided with a first fitting portion and a second fitting portion, wherein the first fitting portion fits a fitting portion of the first handler when the operation member is in the extended position and the second fitting portion fits a fitting portion of the second handler when the operation member is in the pushed-in position.

6. The input apparatus of claim 4,
wherein, when detection signals are continuously output from the second detection unit, a rough retrieval operation is performed in which pieces of data of the displayed plurality of pieces of data are sequentially selected on a data set-by-data set basis, and
wherein the control unit changes a switching period between the data sets in accordance with a rotation angle of the second handler.

7. The input apparatus of claim 4,
wherein, when detection signals are continuously output from the second detection unit, a rough retrieval operation is performed in which pieces of data of the displayed plurality of pieces of data are sequentially selected on a data set-by-data set basis; and
wherein the control unit displays on the display unit a character string or a symbol allowing a user to know that the rough retrieval operation is being performed.

* * * * *